I. B. Tuttle,
Milk Cooler.
No. 99,502.     Patented Feb. 1. 1870.
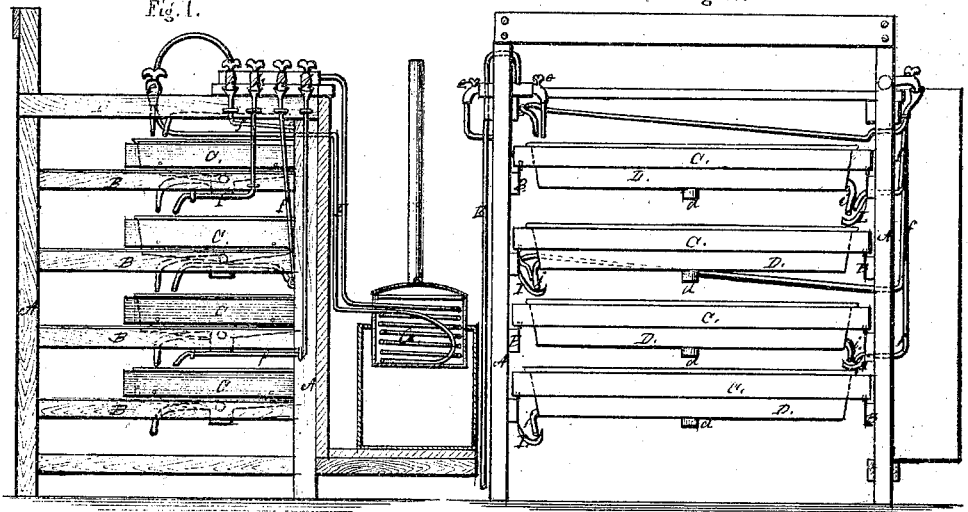
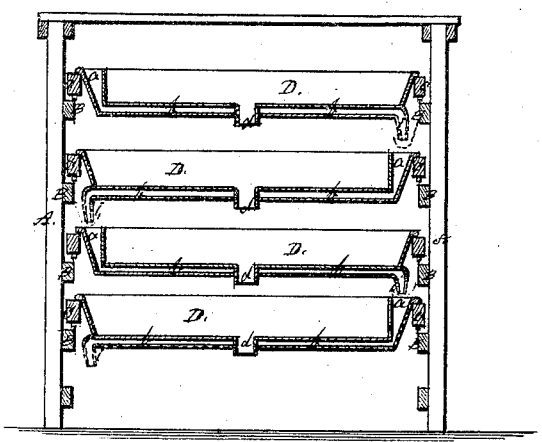
Witnesses
Chas H. Poole
J. R. Woodruff
Inventor,
Ichabod B. Tuttle
By J. F. Pond his Attorney

United States Patent Office.

ICHABOD B. TUTTLE, OF EAST RANDOLPH, NEW YORK.

Letters Patent No. 99,502, dated February 1, 1870.

IMPROVEMENT IN MILK-TEMPERING AND COOLING APPARATUS.

The Schedule referred to in these Letters Patent and making part of the same.

*To all whom it may concern:*

Be it known that I, ICHABOD B. TUTTLE, of East Randolph, in the county of Cattaraugus, and State of New York, have invented a certain new and useful Improvement in Milk-Coolers; and the following is a full, clear, and exact description of the same, reference being had to the accompanying drawings, making a part of this specification, in which—

Figure 1 represents an end elevation of the frame or rack for holding a series of pans or coolers, showing the arrangement of the pipes and stop-cocks for distributing cold or warm water to the various sections, with the heater in the rear, for tempering the flow, as may be desired.

Figure 2 shows a front elevation of the same, with a more distinct view of the outlets, dripping-pipes, and spouts for conveying the waste water off.

Figure 3 is a vertical and longitudinal section of the frame, and series of the pans or coolers, as arranged on the trucks, one above another.

Figure 4 shows an end sectional view of one of the tempering-pans.

The object of my invention is to provide the means of tempering or cooling milk, on a large scale, more uniformly at all seasons, and also prevent the dripping of the water on the floor from any of the sections of the pans, when they are brought forward on the trucks for the purpose of skimming, and drawing off the skimmed milk; and My invention or improvement consists in making elongated openings at one end of the pans or coolers, connecting with the space between the double bottom and troughs or spouts attached to the frame or rack, so that the dripping-pipe from each pan will be always over the spout, or the elongated opening in the end of the pan.

To enable others to make and use my improved milk-cooler, I will describe it, referring to the drawings, and the letters marked thereon.

The frame or rack A A may be made of wood, of any required size or dimensions, to accommodate the dairy, or quantity of milk to be set for taking off the cream, the end rails B B supporting the truck-frames C C, into which the coolers or tempering-pans D D are fitted, so that each one can be moved forward on the rails to receive the milk; also, for the convenience of skimming off the cream, and for drawing off the milk through the short pipe $d$ in the bottom.

The pans D are made with a double bottom, leaving a space, $b\ b$, between them, to admit of a flow of cold or tepid water from the pipe E, or the pipes F, which are coiled around the inside of the boiler G. Each pipe is provided with stop-cocks $e$, so as to shut off or supply each pan with either cold or warm water, as may be required.

In one end of each of the pans D is a long opening or funnel, $a$, to receive the water into the space $b$, in the bottom of the pan. Over each funnel $a$ is a conduit, $f\ f\ f\ f$, which receives the water from the spigots $h\ h\ h$, and conducts it separately to flow through in a greater or lesser quantity, as may be desired.

Each pan is also provided with a discharge-pipe, $i\ i\ i\ i$, whose outlet is over the long opening or funnel $a$ in the pan beneath, so that the water discharged from the upper pan is conducted into the space $b$ of the second pan, and so on through the whole series of pans.

To the rails B B are alternately attached troughs or spouts I I, to convey the drippings from the pipes $i\ i$ into the funnels $a\ a$, when the pans D, or either one of them, are moved to the front of the frame A, so that in whatever position on the rack the pans may be placed or left, with the water running or flowing through under the milk, it will all be discharged at the lower pipe and spout, so that there will be no dripping or wet in other places.

I do not claim, as my invention, the double-bottom pans and cars as arranged, one above the other; but What I do claim as my invention, and desire to secure by Letters Patent, is—

1. The troughs I I, connected with the rails B B, in combination with the discharge-pipes $i\ i$, and elongated funnels $a\ a$, in one end of each pan D, operating for the purposes described.

2. The arrangement of the water-heating apparatus G, the water-cocks $h\ h\ h$, and the conduits $f\ f\ f$, for the purposes herein specified, in combination with the above-described milk-cooling and tempering apparatus.

ICHABOD B. TUTTLE.

Witnesses:
 FRANK W. STEVENS,
 JOHNSON & GOODWILL.